United States Patent [19]

Lunghofer

[11] Patent Number: 5,120,455
[45] Date of Patent: Jun. 9, 1992

[54] HYDRAULIC FRACTURING PROPPING AGENT

[75] Inventor: Eugene P. Lunghofer, Youngstown, N.Y.

[73] Assignees: Carbo Ceramics Inc.; A/S Niro Atomizer, both of Irving, Tex.

[21] Appl. No.: 622,542

[22] Filed: Dec. 5, 1990

Related U.S. Application Data

[60] Continuation of Ser. No. 613,032, May 22, 1984, abandoned, Division of Ser. No. 437,206, Oct. 28, 1982, Pat. No. 4,522,731.

[51] Int. Cl.$^5$ .......................................... E21B 43/267
[52] U.S. Cl. .............................. 252/8.551; 166/280; 166/307; 166/308; 51/298; 51/307; 51/309
[58] Field of Search ................. 252/8.551; 166/280, 166/307, 308; 51/298, 307, 309, DIG. 30

[56] References Cited

U.S. PATENT DOCUMENTS

| | | |
|---|---|---|
| 2,950,247 | 8/1960 | McGuire . |
| 3,245,866 | 4/1966 | Schott . |
| 3,347,798 | 10/1967 | Baer et al. . |
| 3,350,482 | 10/1967 | Bowers . |
| 3,437,148 | 4/1969 | Colpoys . |
| 3,486,706 | 12/1969 | Weyand ............................ 241/184 |
| 3,497,008 | 2/1970 | Graham . |
| 3,856,441 | 12/1974 | Suzukawa et al. . |
| 3,976,138 | 8/1976 | Colpoys et al. . |
| 4,053,375 | 10/1977 | Roberts et al. . |
| 4,068,718 | 1/1978 | Cooke et al. . |
| 4,140,773 | 2/1979 | Stowell et al. . |
| 4,427,068 | 1/1984 | Fitzgibbon . |
| 4,522,731 | 6/1985 | Lunghofer ..................... 252/8.551 |

FOREIGN PATENT DOCUMENTS

| | | |
|---|---|---|
| 1045027 | 12/1978 | Canada . |
| 137042 | 1/1978 | Denmark . |
| 2948584 | 6/1980 | Fed. Rep. of Germany . |
| 1483696 | 6/1967 | France . |
| 1411135 | 10/1975 | United Kingdom . |
| 1421531 | 1/1976 | United Kingdom . |
| 2037727 | 7/1980 | United Kingdom . |

OTHER PUBLICATIONS

"Hydraulic Fracturing with a High Strength Proppant", *Amer. Inst. Mining Metallurgical and Petroleum Engrs., Inc.,* Cooke, 1976.

*Chem. Abstracts,* vol. 85, No. 24, pp. 253 181 . . . 448a.

"The Effect of Various Proppants and Proppant Mixtures on Fracture Permeability", *SPE,* McDaniel, et al., 1978.

"Light Weight Proppants for Deep Gas Well Stimulation," *Terra Tek,* Jones, et al. Jun. 1980.

*Oxide Ceramic Proppants for Treatment of Deep Well Fractures,* E. A. Neel, J. L. Parmley, and P. J. Colpoys, 1977, Soc. Petrol. Eng. Paper No. 6816.

*The Ideal Proppant for Deep Wells and High Compaction Pressures,* Union Carbide.

*Contracts for field projects and supporting research on Enhanced Oil Recovery and Improved Drilling Technology,* No. 21, pp. 107-109, DOE/BETC-80/1, Dec. 31, 1979.

*Contracts for field projects and supporting research on Enhanced Oil Recovery and Improved Drilling Technology,* No. 22, pp. 127-128, DOE/BETC-80/2.

*Contracts for field projects and supporting research on Enhanced Oil Recovery and Improved Drilling Technology,* No. 23, pp. 127-131, DPE/BETC-80/3.

*Contracts for field products and supporting research on Enhanced Oil Recovery and Improved Drilling Technology,* No. 24, pp. 151-152, DPE/BETC-80/4.

(List continued on next page.)

Primary Examiner—John S. Maples
Assistant Examiner—Gary L. Geist
Attorney, Agent, or Firm—Pravel, Gambrell, Hewitt, Kimball & Krieger

[57] ABSTRACT

A high strength propping agent for use in hydraulic fracturing of subterranean formations comprising solid, spherical particles having an alumina content of between 40 and 60%, a density of less than 3.0 gm/cc and an ambient temperature permeability of 100,000 or more millidarcies at 10,000 psi.

28 Claims, 5 Drawing Sheets

OTHER PUBLICATIONS

*Contracts for field projects and supporting research on Enhanced Oil Recovery and Improved Drilling Technology,* No. 26, pp. 129–130, DOE/BETC-81/2, Mar. 31, 1981.

*Contracts for field projects and supporting research on Enhanced Oil Recovery and Improved Drilling Technology,* No. 27, pp. 115–117, DOE/BETC-81/3, Jun. 30, 1981.

*Determine Feasibility of Fabricating Light Weight Proppants for Application in Gas and Oil Well Stimulation,* Progress Reports 2 and 10, Oct. 1979 and Jul. 1980, respectively.

*Lightweight Proppants for Deep Gas Well Stimulation,* Second Annual Report, R. A. Cutler and A. H. Jones, Jul. 1980–Jun. 1981.

*New Proppants for Deep Gas Well Stimulation,* R. A. Cutler and A. H. Jones, Soc. Petrol. Eng. paper No. 9869 (1981).

*Effect of Grinding and Firing Treatment on the Crystalline and Glass Content and the Physical Properties of Whiteware Bodies,* S. C. Sane and Ralph L. Cook, J. Am. Ceram. Soc. 34 pp. 145–151 (1951).

*Nepheline Syenite-Talc Mixtures as a Flux in Low-Temperature Vitrified Bodies,* E. D. Lynch and A. W. Allen, J. Am. Ceram. Soc. (Apr. 1950) pp. 117–120.

*Engineering Properties of Ceramics-Databook to Guide Materials Selection for Structural Applications,* J. F. Lynch, C. G. Ruderer, W. H. Duckworth, Technical Report AFML-TR-66-52, Jun. 1966.

*Reactions in Silica-Alumina Mixtures,* Richard R. West and Thomas J. Gray, J. Am. Ceram. Soc. (Apr. 1958) pp. 132–136.

*Synthesis and Mechanical Properties of Stoichiometric Aluminum Silicate (Mullite),* K. S. Mazdiyasni, L. M. Brown, J. Am. Ceram. Soc. 55 (1972) pp. 548–552.

Coors Porcelain Company letter to Halliburton Services disclosing a mullite proppant. (Aug. 4, 1978).

FIG. 1
PERMEABILITY VS. CLOSURE STRESS COMPARISON

HYDRAULIC FRACTURING PROPPING AGENT

This is a continuation of application Ser. No. 613,032 filed May 22, 1984, now abandoned, which is a division of application Ser. No. 437,206 filed Oct. 28, 1982, now U.S. Pat. No. 4,522,731.

BACKGROUND OF THE INVENTION

The present invention relates to propping agents for use in hydraulic fracturing of subterranean formations surrounding oil wells, gas wells, and similar boreholes.

Hydraulic fracturing is a well stimulation technique designed to increase the productivity of a well by creating highly conductive fractures or channels in the producing formation surrounding the well. The process normally involves two steps. First a fluid is injected into the well at a sufficient rate and pressure to rupture the formation thereby creating a crack (fracture) in the reservoir rock. Thereafter a particulate material (propping agent) is placed into the formation to "prop" open the fracture.

In order for well stimulation to occur, the propping agent must have sufficient mechanical strength to withstand the closure stresses exerted by the earth. If the propping agent is not strong enough to resist the earth's closure stresses, then the propping agent will tend to disintegrate thereby reducing the permeability of the propped fracture.

On the other hand, the propping agent must also be inexpensive since large volumes of propping agent are used in a well stimulation treatment. For example, it takes 135,520 pounds of sintered bauxite propping agent to fill a 968 ft$^3$ fracture. McDaniel et al., "The Effect of Various Proppants and Proppant Mixtures on Fracture Permeability," SOCIETY OF PETROLEUM ENGINEERS OF AIME, AIME Paper No. SPE 7573 (1978) at p. 4 (McDaniel et al.)

Because of its low cost, relative abundance and low density sand is the ideal propping agent for hydraulic fracturing of low closure stress (4,000 psi or less) formations. While specially screened (usually 20-40 mesh) high grade sand (e.g., Ottawa sand) can be used with higher closure stress formations, performance drops off drastically as stress increases, particularly above 8,000 psi. At stresses of 10,000 psi and above even the highest grade sand is inadequate.

Heretofore, the only propping agents known to be able to withstand closure pressures of 10,000 psi or greater was a high density sintered bauxite propping agent. Cooke, "Hydraulic Fracturing with a High-Strength Proppant", SOCIETY OF PETROLEUM ENGINEERS OF AIME, AIME Paper No. SPE 6213 (1976); Jones et al., "Light Weight Proppants for Deep Gas Well Stimulation", submitted to Bartlesville Energy Technology Center by Terra Tek, Inc., under Government Contract #DE-AC19-79BC10038 (June 1980) (Terra Tek paper); McDaniel et al. Described in U.S. Pat. No. 4,068,718 (Cooke et al.), this high strength propping agent consists of sintered bauxite particles having a specific gravity greater than 3.4. High density is described as a critical feature of this propping agent. According to Cooke et al., the high density is necessary to attain high strength and resist fragmentation under high stress levels. They explain that permeability drops off significantly when low density particles (specific gravity below 3.4) are used. (Col. 6, lines 6–35.)

High grade alumina propping agents were also reported to be able to withstand closure pressures of 10,000 psi in U.S. Pat. No. 3,976,138 (Colpoys et al.). This, however, has not been confirmed by independent investigators. In any event, the Colpoys et al. propping agent also consists of high density particles, i.e., specific gravities of 3.40 and greater. Although Colpoys et al. describe a lower density low grade alumina propping agent as well, they do not report that this less preferred propping agent is able to withstand such severe conditions.

While the sintered bauxite propping agent is advantageous in that it can withstand closure pressures of 10,000 psi or greater, there are certain disadvantages associated with its use. On account of its high-density, it requires high viscosity fracturing fluids and/or high pumping rates along with low proppant concentration. This makes fracture control and high conductivity fractures more difficult to obtain. (See Terra Tek paper at p. 3.) Since the Colpoys et al. propping agent has a similar high density, the same problems would be expected to be associated with its use. Additionally, sintered bauxite is relatively expensive. The cost per pound of bauxite is ten to fifteen times that of sand. (See Terra Tek paper at pp. 2-3 and McDaniel et al. at p. 4.) Accordingly, there has been a definite need for a lower density and less expensive propping agent having the mechanical strength to withstand closure pressures of 10,000 psi or greater.

SUMMARY OF THE INVENTION

It is, therefore, a main object of the present invention to provide a propping agent for hydraulic fracturing of subterranean formations which overcomes the above-mentioned drawbacks.

It is a more specific object of the present invention to provide a propping agent for hydraulic fracturing of subterranean formations which has sufficient mechanical strength to be able to withstand closure pressures of 10,000 psi or greater but also has a density of less than 3.0 gm/cc.

A further object of this invention is to provide a propping agent for use in hydraulic fracturing of subterranean formations which is less expensive than sintered bauxite propping agent.

Another object of this invention is to provide a propping agent for use in hydraulic fracturing of subterranean formations which requires lower viscosity fracturing fluids and lower pumping rates than sintered bauxite propping agent.

A still further object of this invention is to provide a propping agent for hydraulic fracturing of subterranean formations which facilitates fracture control and the obtaining of high conductivity fractures.

An additional object of this invention is to provide an economical alternative to sand for medium closure stress (6,000–10,000 psi) subterranean formations.

Additional objects and advantages of the invention will be set forth in part in the description which follows, and in part will be obvious from the description, or may be learned by practice of the invention. The objects and advantages of the invention may be realized and obtained by means of instrumentalities and combinations particularly pointed out in the appended claims.

To achieve the objects, and in accordance with the purpose of the invention, as embodied and broadly described herein, the invention comprises a high-strength propping agent for use in hydraulic fracturing of subterranean formations comprising solid spherical particles, the particles having an alumina content of between 40 and 60%, a density of less than 3.0 gm/cc, and an ambient temperature permeability of 100,000 or more millidarcies at 10,000 psi.

To further achieve the objects in accordance with the purpose of the invention as embodied and broadly described herein, the invention comprises a hydraulic fracturing method in which a fluid is injected into a subterranean formation to open a fracture therein and a propping agent is placed in the formation to prop open the fracture, the propping agent being solid, spherical particles having an alumina content of between 40 and 60%, a density of less than 3.0 gm/cc, and an ambient temperature permeability of a 100,000 or more millidarcies at 10,000 psi.

The foregoing and other objects, features, and advantages of the present invention will be made more apparent from the following description of the preferred embodiment.

DESCRIPTION OF THE PREFERRED EMBODIMENTS

Reference will now be made in detail to the present preferred embodiments of the invention.

A high strength propping agent for use in hydraulic fracturing of subterranean formations surrounding oil wells, gas wells and similar boreholes in accordance with the present invention comprises solid, spherical particles having an alumina content of between 40 and 60%, a density of less than 3.0 gm/cc, and an ambient temperature permeability of 100,000 or more millidarcies at 10,000 psi.

For purposes of the present invention the propping agent particles should have an alumina (Al$_2$O$_3$) content of between 40 and 60%, preferably between 45.5 and 60%, and a silica (SiO$_2$) content of between 36.5 and 56.5%, preferably between 36.5 and 51%. Good results have been obtained with material having the following composition (calcined basis):

| | |
|---|---|
| SiO$_2$ | 45.8 |
| Al$_2$O$_3$ | 50.7 |

| -continued | |
|---|---|
| TiO$_2$ | 2.60 |
| Fe$_2$O$_3$ | 0.70 |
| CaO | 0.03 |
| MgO | 0.04 |
| Na$_2$O | 0.06 |
| K$_2$O | 0.05 |
| Li$_2$O | 0.02 |
| Total | 100.00 |

This material had a density of about 2.62–2.65 gm/cc.

In a preferred embodiment, the propping agent particles are made from Eufaula bauxite. The term "Eufaula bauxite" refers to a bauxitic-kaolin type material deposited in and around Eufaula, Alabama. See Burst, J. F., "Genetic Relationship of the Andersonville, Ga. and Eufaula, Ala. Bauxitic-Kaolin Areas", Society of Mining Engineers, *AIME Transactions*, Vol. 246, pp. 137–144 (June 1974), which is incorporated by reference herein as background information. Preferably, the Eufaula bauxite will contain at least some (above 5%) gibbsite. The greater the gibbsite content the higher the loss on ignition. Preferably the loss on ignition will be between 14.5 and 20%. Good results have been obtained with a gibbsite content yielding a loss on ignition of about 17.1%.

A small amount (up to 5%) of the Eufaula bauxite may be replaced with a crush strength enhancer selected from the group: nepheline syenite, fused bauxite dust, wollastonite, talc, and feldspar. Of these, nepheline syenite is the preferred crush strength enhancer. It is believed that addition of up to 5% of one of these crush strength enhancers will serve to impede cristobalite formation upon sintering of the raw material and thereby enhance the crushing strength of the final particles.

The propping agent particles of the present invention may be made by the methods disclosed in copending U.S. Patent application No. 437,321 of Eugene Paul Lunghofer, Sten Mortensen, and Aubrey Ward, filed concurrently herewith on Oct. 28, 1982 for A Process For The Production Of Sintered Bauxite Spheres, now U.S. Pat. No. 4,440,866. As explained therein, an aqueous feed suspension comprising the bauxitic-kaolin type material and a suitable binder is prepared. The feed suspension is then continuously atomized into a layer of already partly dried particles fluidized in a stream of drying air. Particles are continually recovered from this layer and continuously separated into oversized, undersized, and product fractions, making allowance for anticipated shrinkage in the subsequent sintering operation. Undersized fractions, relatively fine product fractions, ground product fractions, and ground oversized product fractions are continuously recycled to the layer of fluidized particles at a substantial distance (measured along the flow path of the particles) from the site where the recovery of such particles takes place. The non-recycled product fractions are dried and sintered by heating at a temperature of between 1200° and 1650° C.

Propping agents made from the above-described materials and by the above-described methods will have a density of less than 3.0 gm/cc, thus, overcoming the disadvantages associated with the high-density sintered bauxite propping agent described above. In a preferred embodiment, the propping agent of the present invention has a Krum being sphericity of about 0.9 or greater. Preferably, 90 percent or more of the propping agent particles of the present invention are 30–40 mesh. More-over, contrary to the teachings of Cooke et al., the lower density propping agent of the present invention has sufficient mechanical strength to withstand closure stresses of 10,000 psi or greater. The suitability of the propping agents of the present invention for such high closure stress applications is demonstrated by the comparative permeability testing described in Example 1.

EXAMPLE 1

Permeability

The permeability of a 20–40 mesh sample of the propping agent of the present invention was compared to a 20–40 mesh sample of sintered bauxite propping agent of the type described by Cooke et al. The propping agent of the present invention had the following composition (calcined basis):

| | |
|---|---|
| $SiO_2$ | 45.80 |
| $Al_2O_3$ | 50.70 |
| $TiO_2$ | 2.60 |
| $Fe_2O_3$ | 0.70 |
| CaO | 0.03 |
| MgO | 0.04 |
| $Na_2O$ | 0.06 |
| $K_2O$ | 0.05 |
| $Li_2O$ | 0.02 |
| Total | 100.00 |

It had a density of about 2.62–2.65 gm/cc. The sintered bauxite propping agent was a commercial product obtained from The Norton Company. It had an alumina content of between 86 and 89% and a density of about 3.68–3.75 gm/cc.

Permeability was determined by pumping deionized water at a known rate through a known volume (70 ml loose) of each sample placed in a permeameter designed to stimulate a propped fracture This was done at ambient temperature and at various closure stresses between 500 and 12,000 psi. A constant value of closure stress was maintained by a hydraulic press. The pressure drop across the simulated fracture was recorded as was the propped fracture thickness for each closure stress. The test results ar graphically illustrated in FIG. 1. For additional comparison, the results of permeability testing on 20–40 mesh Ottawa sand is also plotted.

Figure 1:
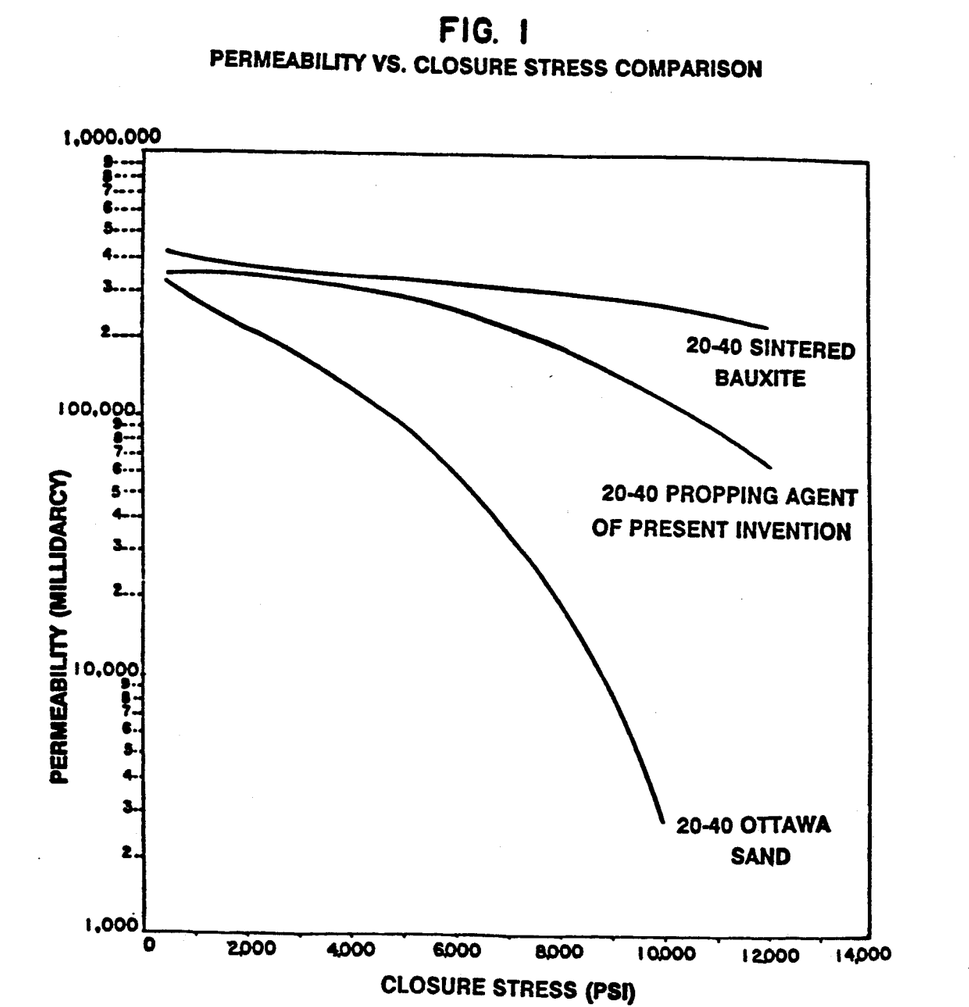
FIG. 1 is a plot of permeability versus closure stress for samples of sintered bauxite, Ottawa sand and the propping agent of the present invention tested under laboratory conditions.

The permeability of the propping agent of the present invention decreases more rapidly with increasing closure stress than does the permeability of the sintered bauxite propping agent. Nevertheless, the propping agent of the present invention maintains a permeability of greater than 100,000 millidarcies at closure pressures of up to 10,000 psi. Even at 12,000 psi, the permeability of the propping agent of the present invention is still very high. These results indicate that the propping agent of the present invention is suitable for high closure stress gas and oil well applications.

Examples 2-4 illustrate that the propping agent of the present invention also meets the American Petroleum Institute's sand specifications for sieve analysis, sphericity and roundness evaluation, and crush resistance. Although Example 5 shows that the acid solubility of the propping agent of the present invention is just outside the American Petroleum Institute sand specifications, the brine exposure test reported in Examples 6 and 7 shows that the propping agent of the present invention has corrosive resistance of the same order as both sintered bauxite and Ottawa sand propping agents. (The American Petroleum Institute has not yet promulgated an official specification for sintered bauxite propping agent.)

EXAMPLE 2

Sieve Analysis

Samples of 100.0 gm of the materials tested in Example 1 were placed in a nest of sieves and shaken for 15 minutes using sieve sizes recommended by American Petroleum Institute procedures. The sample remaining on each sieve was then weighed to determine the percent retained. The results were as follows:

| | Percent Retained | | |
|---|---|---|---|
| Sieve Size | Propping Agent of Present Invention | Sintered Bauxite | API Specifications (Sand) |
| 16 | 0.00 | 0.00 | 0.00 |
| 20 | 0.00 | 8.33 | |
| 30 | 55.84 | 60.37 | $\geqq 90.00$ |
| 35 | 41.28 | 23.23 | |
| 40 | 2.82 | 7.66 | |
| 50 | 0.02 | 0.25 | $\leqq 1.00$ |
| PAN | 0.01 | 0.01 | |

EXAMPLE 3

Sphericity and Roundness Evaluation

Twenty particles of the materials tested in Example 1 were visually examined for sphericity and roundness using Krumbein's and Sloss' chart for visual estimation of roundness and sphericity. The results were as follows:

| Sample | Sphericity | Roundness |
|---|---|---|
| Propping Agent of Present Invention | 0.9 | 0.9 |
| Sintered Bauxite | 0.9 | 0.9 |
| API Specification (Sand) | $\geqq 0.6$ | $\geqq 0.6$ |

EXAMPLE 4

Crush Resistance

Forty-gram samples of a particular particle size of the materials tested in Example 1 were isolated and placed in a test cell. The cell was placed in a hydraulic press and 12,500 pounds of force was applied for two minutes. The samples where then sieved and the fines collected and weighed. The results were as follows:

| Sample | Percent Crushable |
|---|---|
| Propping Agent of Present Invention | 0.20 |
| Sintered Bauxite | 0.25 |
| API Specification (Sand) | $\leqq 8.00$ |

Samples of the materials tested in Example 1 were dried to a constant weight and 5 gm. were weighed to the nearest 0.1 mg. The sample was treated with 100 ml. of 12% HCl-3% HF in a water bath at 65.6° C/ for 30–35 minutes. The samples were filtered, washed and dried to a constant weight. The weight loss was determined and computed as a percent. The results were as follows:

| Sample | Percent Solubility |
| --- | --- |
| Propping Agent of Present Invention | 2.99 |
| Sintered Bauxite | 1.39 |
| API Specification (Sand) | <2.00 |

(Because of the small sample size, the precision of this test is questionable. For example, other tests with sintered bauxite propping agent have yielded a 7% acid solubility.)

EXAMPLE 6

Brine Exposure

20–40 mesh samples of the materials tested in Example 1 were placed in a test cell and heated to 250° F. For both propping agents, a concentration of 2 lb/ft² were used. A liquid brine solution was pumped through the propping agent at a constant rate for a period of 24 hours. The brine solution had the following ingredients: 8% NaCl and 2.5% CaCl. This solution was preheated to match the cell temperature of 250° F. The closure stress on the propping agents were maintained at a constant level of 8,000 psi throughout the test. During the entire test, the pressure drop through the propping agent was recorded in order to determine the permeability decay.

Figure 2:
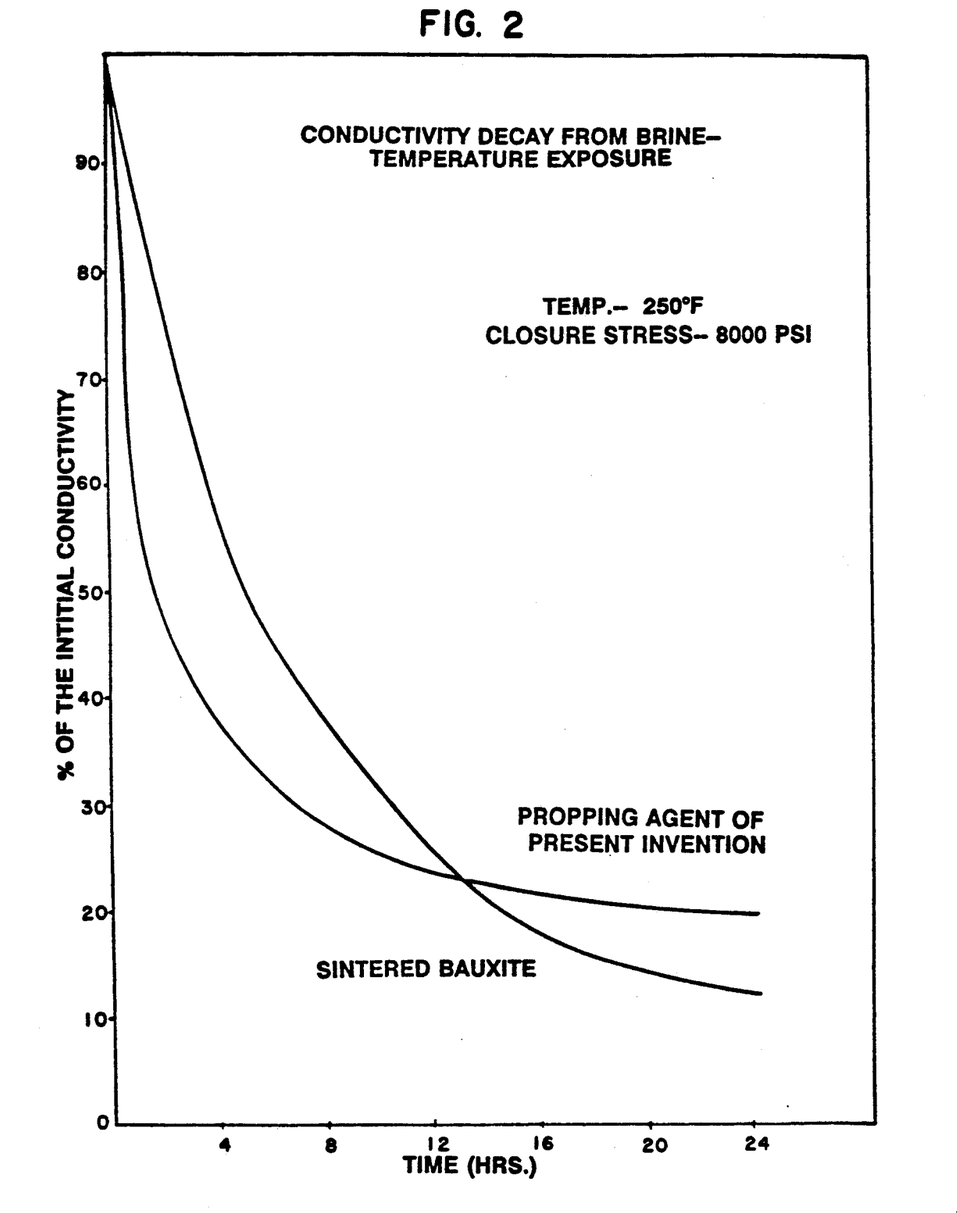
FIG. 2 is a plot of conductivity decay from brine and high temperature exposure versus time for samples of sintered bauxite and the propping agent of the present invention tested under laboratory conditions.

The results of the conductivity decay over time for these two materials is shown in FIG. 2. The conductivities were normalized with respective initial conductivities to enable direct comparison. As can be seen from FIG. 2, the percent decay in the conductivity of the propping agent of the present invention was slightly less than that of the sintered bauxite propping agent.

EXAMPLE 7

Brine Exposure

Figure 3:
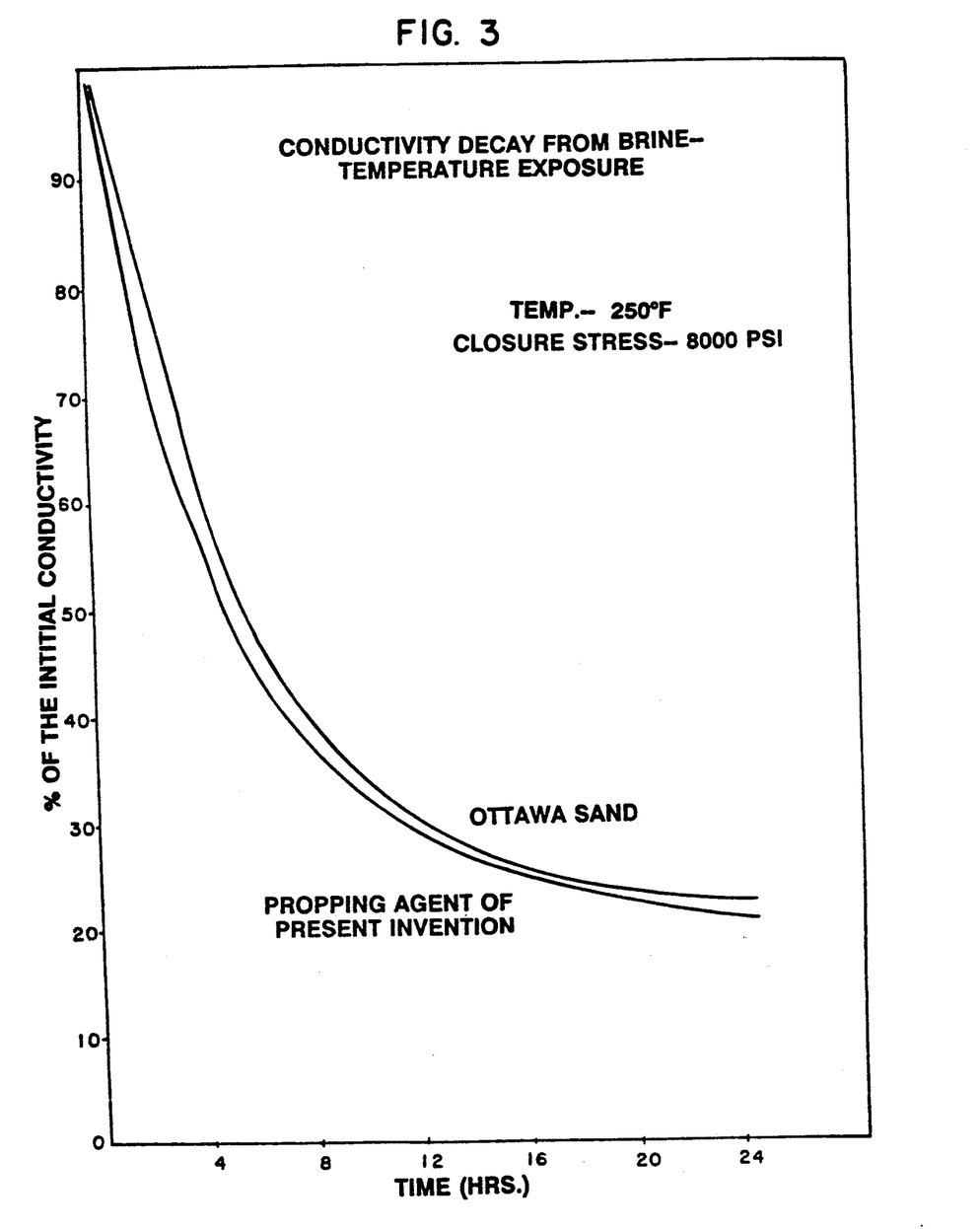
FIG. 3 is a plot of conductivity decay from brine and high temperature exposure versus time for samples of Ottawa sand and the propping agent of the present invention tested under laboratory conditions.

Tests similar to that of Example 6 were run with 20–40 mesh samples of the propping agent of the present invention tested in Example 1 and Ottawa sand at 4,000 psi. These results are graphically illustrated in FIG. 3. As can be seen from FIG. 3, the percent decay in conductivity is essentially identical for both the propping agent of the present invention and Ottawa sand.

In addition to being useful in hydraulic fracturing of high closure stress (10,000 psi or greater) subterranean formations, the propping agent of the present invention is also useful for medium closure stress (6,000–10,000 psi) applications. Not only will the propping agent of the present invention perform better than sand under such conditions, but also only one third as much propping agent is required. Thus, treatment of medium closure stress subterranean formations with the propping agent or the present invention is an economically feasible alternative to treatment with sand. Examples 8–10 illustrate the comparative effectiveness of the propping agent of the present invention and Ottawa sand at a concentration ratio of 1:3.

EXAMPLE 8

20–40 mesh samples of the propping agent of the present invention tested in Example 1 and Ottawa sand were placed in a test cell and heated to 250° F. at a closure stress of 1,000 psi. Preheated nitrogen at 100 psi was passed through the sample during this period. When the target test temperature was reached, gas flow rates were varied to produce superficial velocities from 1 cm/sec to 30 cm/sec. Gas temperatures at entrance and exit of cell along with cell temperature were recorded. Gas flow rate, sample height and pressure drop along 10 cm. cell length was measured. Each flow was allowed to reach steady state conditions before proceeding to the next flow rate. The above flow ranges were repeated for closure stresses of 2,000, 4,000, 6,000, 8,000 and 10,000 psi. The data was then analyzed producing values at each closure stress for Darcy permeability and conductivity at various flow rates, turbulence factor and absolute permeability. Flow rates were controlled by use of a metering valve placed at the exit of the cell, thus allowing test pressure to be controlled. Flow rates were measured at atmospheric conditions by a thermal flowmeter at high and medium rates and a rotometer for low flow rates. Gas flow rate and density at test conditions was calculated from atmospheric measurements assuming ideal gas behavior and using an average gas temperature pressure in the cell.

Tests were conducted using the propping agent of the present invention at concentrations of 0.5, 1.0 and 1.5 lb/ft², and Ottawa sand at concentrations of 1.5, 3.0 and 4.5 lb/ft². For the propping agent of the present invention the following results were obtained:

| Concentration (lb/ft²) | Closure Stress (psi) | Turbulence Factor 2 (atm-sec² gm) | Conductivity (md/ft) | Permeability (md) | Predicted Beta (atm-sec² gm) |
| --- | --- | --- | --- | --- | --- |
| 0.5 | 6,000 | — | 480 | — | — |
| 1.0 | 6,000 | $2.3 \times 10^{-3}$ | 1,550 | 139,000 | $1.3 \times 10^{-3}$ |
| 1.5 | 6,000 | $1.5 \times 10^{-3}$ | 2,270 | 139,000 | $1.3 \times 10^{-3}$ |
| 0.5 | 8,000 | — | 210 | — | — |
| 1.0 | 8,000 | $2.9 \times 10^{-3}$ | 1,030 | 89,300 | $2.6 \times 10^{-3}$ |
| 1.5 | 8,000 | $2.0 \times 10^{-3}$ | 1,210 | 78,000 | $3.2 \times 10^{-3}$ |
| 0.5 | 10,000 | — | 170 | — | — |
| 1.0 | 10,000 | $5.7 \times 10^{-3}$ | 520 | 52.600 | $6.0 \times 10^{-3}$ |
| 1.5 | 10,000 | $3.1 \times 10^{-3}$ | 750 | 55.000 | $5.5 \times 10^{-3}$ |

(Due to the difficulty of measuring sample height at low proppant concentrations, the permeability and turbulence factors for 0.5 lb/ft² tests are not reported.)

For Ottawa sand, the following data was obtained:

| Concentration (lb/ft²) | Closure Stress (psi) | Turbulence Factor 2 (atm-sec² gm) | Conductivity (md/ft) | Permeability (md) | Predicted Beta (atm-sec² gm) |
| --- | --- | --- | --- | --- | --- |
| 1.5 | 6,000 | — | 600 | — | — |
| 3.0 | 6,000 | $3.1 \times 10^{-3}$ | 1,070 | 44,000 | $7.7 \times 10^{-3}$ |
| 4.5 | 6,000 | $3.3 \times 10^{-3}$ | 2,000 | 106,300 | $2.0 \times 10^{-3}$ |
| 1.5 | 8,000 | — | 180 | — | — |
| 3.0 | 8,000 | $2.05 \times 10^{-2}$ | 550 | 22,520 | $2.2 \times 10^{-2}$ |
| 4.5 | 8,000 | $7.6 \times 10^{-3}$ | 600 | 18,500 | $2.9 \times 10^{-2}$ |
| 1.5 | 10,000 | — | 100 | — | — |
| 3.0 | 10,000 | $6.91 \times 10^{-2}$ | 200 | 8,620 | $9.6 \times 10^{-2}$ |
| 4.5 | 10,000 | $1.0 \times 10^{-2}$ | 280 | 10,700 | $6.8 \times 10^{-2}$ |

Figure 4:
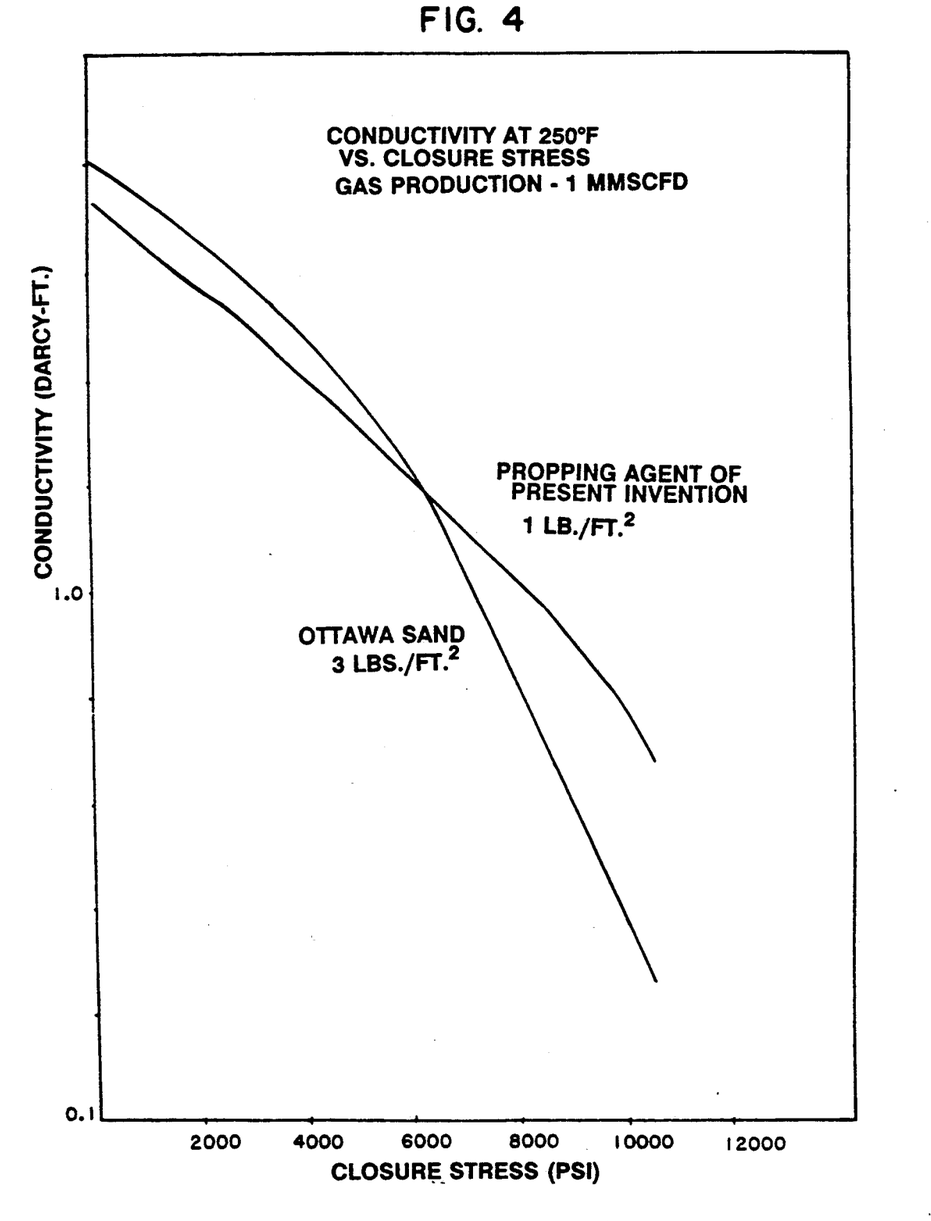
FIG. 4 is a plot of conductivity versus closure stress at a flow rate of 1 Mscf/D for a concentration of 1 lb/ft$^2$ of the Propping agent of the present invention and a concentration of 3 lb/ft$^2$ of Ottawa sand tested under laboratory conditions.
Figure 5:
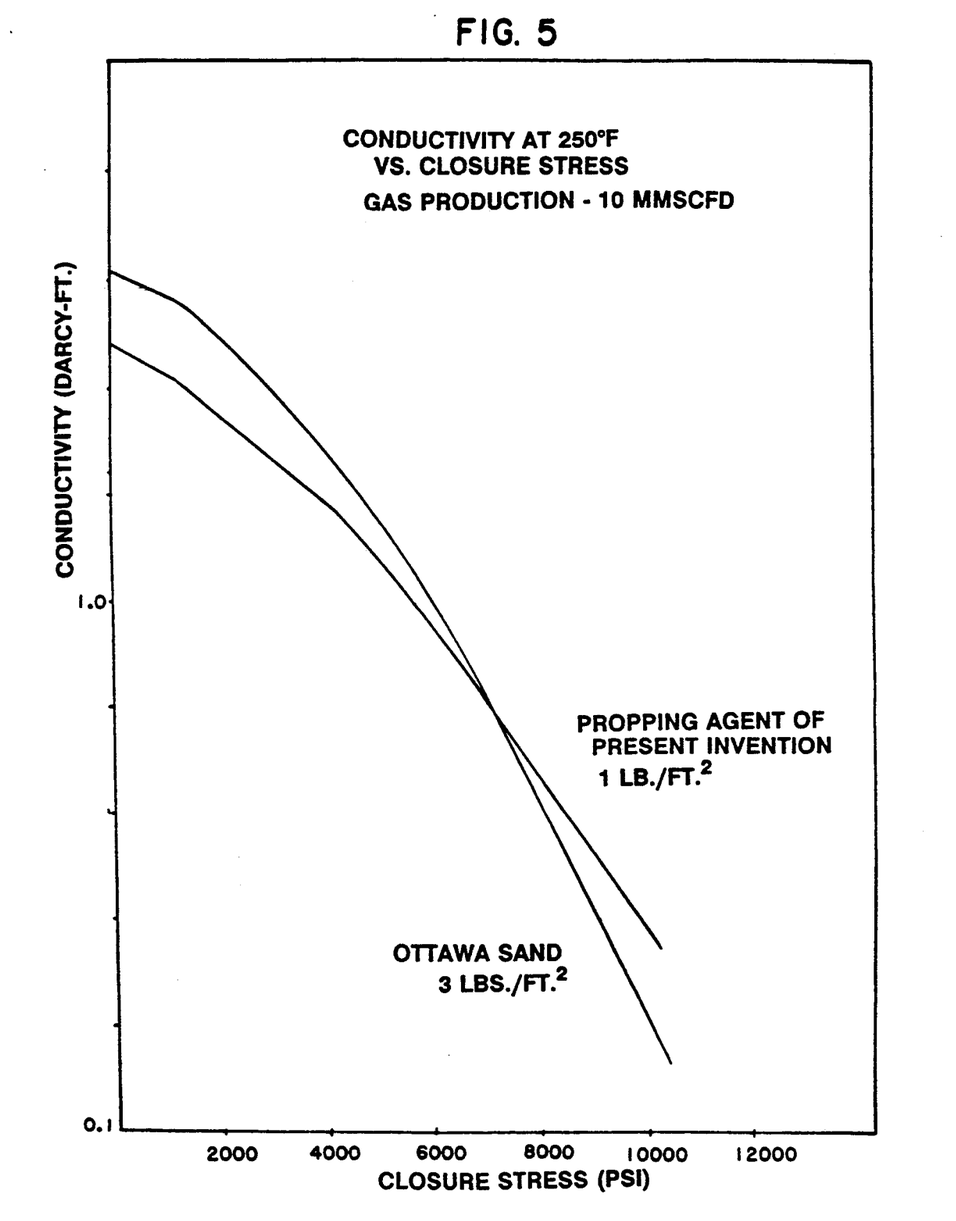
FIG. 5 is a plot of conductivity versus closure stress at a flow rate of 10 Mscf/D for a concentration of 1 lb/ft$^2$ of the propping agent of the present invention and a concentration of 3 lb/ft$^2$ of Ottawa sand tested under laboratory conditions.

Because of the effect of turbulance becomes more predominant at increasing velocities, it is not sufficient to compare absolute permeabilities and conductivities alone. Therefore, FIGS. 4 and 5 show Darcy conductivity at two different velocities, which would be encountered in fractured wells producing approximately 1,000 Mscf/D to 10,000 Mscf/D. These figures illustrate that at low flow rates the propping agent of the present invention possesses a conductivity exceeding that of three times the concentration of sand at 6,000 psi and above, and at higher flow rates the propping agent of the present invention has a conductivity exceeding that of three times the concentration of sand at 6,500 psi and above.

EXAMPLE 9

20-40 mesh sample of the propping agent of the present invention tested in Example 1 and Ottawa sand were placed in a test cell in concentrations of 1 lb/ft$^2$ and 3 lb/ft$^2$, respectively. The test cell was set up as in Example 8. The closure stress was brought to 4,000 psi and the temperature of the cell increased to 250° F. Preheated nitrogen was flowed through the propping agent as previously described to determine the initial conductivity. Next, a solution of fracturing fluid, broken with an enzyme breaker, was pumped through the propping agent at a low, constant rate for a period of four hours. This simulated the initiation of the clean-up process. The fluid was preheated to approximately 250° F. The same volume of the broken fluid was pumped for each test. This was followed by preheated nitrogen to continue the simulation of the clean-up process. Pressure drop through the sample was monitored until it became a constant. At this time, various flow rates of nitrogen were used to determine the final permeability. The results were as follows:

| Propping Agent | Conductivity Initial | (darcy-ft) Final |
|---|---|---|
| Propping Agent of Present Invention | 1.46 | 0.20 |
| Ottawa Sand | 2.62 | 0.18 |

The initial conductivities correspond to measurements made prior to pumping the broken fracturing fluid. The final conductivities were measured after residue damage by the broken fracturing fluid had been accomplished. It is evident from these results that a very large amount of damage occurred in both tests. However, it is interesting to note that even though the conductivity of the propping agent of the present invention was initially much less than the Ottawa sand, the final conductivities were essentially equal. This indicates that less damage was actually incurred on the propping agent of the present invention than on the Ottawa sand.

EXAMPLE 10

Several cases were run on a single phase, two-dimensional, finite difference reservoir simulator. The effects of both formation properties and fracture properties were studied. For each set of formation and fracture properties, two cases were run: one with Ottawa sand as propping agent and another with the propping agent of the present invention tested in Example 1. The propping agent of the present invention was used at a 1:3 ratio (by weight) compared to Ottawa sand. The following properties were held constant for all simulations presented here:

1. New pay thickness 125 ft.
2. Initial closure stress = 8000 psi
3. Initial reservoir pressure = 4000 psi
4. Gas gravity = 0.68
5. Well spacing 640 acres
6. Minimum surface flowing pressure = 1000 psi The sensitivity to (1) formation permeability, (2) proppant permeability damage by fluid residue, and (3) fracture length are presented in Table 1:

|  | Cumulative Production Improvement | | | | | |
|---|---|---|---|---|---|---|
|  | @ 1 year | | @ 7 years | | @ 15 years | |
|  | MMSCF | % | MMSCF | % | MMSCF | % |
| Case 1: | | | | | | |
| Formation Perm = 0.008 md, Frac Length = 1600 ft. No Damage Initial Q = 3.5 MMSCF/D | 0 | 0 | 10 | 0.2 | 93 | 1.6 |
| Case 2: | | | | | | |
| Formation Perm = 0.1 md, Frac Length = 1600 ft. 75% Damage Initial Q = 3.5 MMSCF/D | 0 | 0 | 533 | 6.9 | 925 | 7.3 |
| Case 3: | | | | | | |
| Formation Perm = 0.1 md, Frac Length = 1100 ft. 50% Damage Initial Q = 3.5 MMSCF/D | 0 | 0 | 315 | 3.8 | 775 | 5.7 |
| Case 4: | | | | | | |
| Formation Perm = 0.008 md, Frac Length = 1600 ft. No Damage Initial Q = 2 MMSCF/D | 0 | 0 | 14 | 0.4 | 11 | 0.33 |

EXAMPLE 11

This Example illustrates a method of making the hydraulic fracturing propping agents of the present invention. It is also recorded as Example 3 of co-pending U.S. Patent application No. 437,321 of Eugene Paul Lunghofer, Sten Mortensen, and Aubrey Ward, filed concurrently herewith on Oct. 28, 1982 for A Process For The Production Of Sintered Bauxite Spheres now U.S. Pat. No. 4,440,866.

The starting material in this example is a bauxitic-kaolin ore from Eufaula, Alabama having the following analysis by weight after ignition at 800° C.: $Al_2O_3$ 50.7%; $SiO_2$ 45.8%; $TiO_2$ 2.60%; $Fe_2O_3$ 0.71%; with the remainder being alkali and alkali-earth metal oxides. An aqueous dispersion of the material as mined is prepared using ball milling or mechanical agitation and addition of 0.25% "DARVAN C" or 0.2% sodium pyrophosphate. Water is added to a solids content of 45%. The pH is adjusted with NaOH to above 8 to insure complete deflocculation and low viscosity. 0.75% "GEL-VATOL" 20/30 is added as a temporary binder.

This feed, in an amount of 4,000 kg/hour, is passed through pressure nozzles in a fluid bed unit having a fluidizing area of 3 m.2 The velocity of the fluidizing air is 1 2 m/sec, the inlet temperature of the air is 550° C., and the outlet temperature of the air is 70° C. Recycled material introduced through a powder inlet amounts to 1700 kg/hour. The height of the fluidized particle layer is approximately 35 cm. The average residence time of the particles in the fluidized layer is about 15 minutes.

Material is withdrawn in a quantity of 3400 kg/hour, which by sieving is separated into: an oversized fraction having a particle size of about 2.1 mm (50 kg/hour); a course product fraction having a particle size of between 1.2 and 2.1 mm (300 kg/hr); a fine product fraction having a particle size of between 0.6 and 1.2 mm (2450 kg/hour); and an undersized fraction having a particle size below 0.6 mm (600 kg/hour). Also in a bag filter collector unit 300 kg/hour entrained particles are collected and recycled to the tank holding the feed.

The total amount of the oversized fraction together with 400 kg/hour of the fine product fraction is ground in a grinding unit having a sieve of mesh size 3,000 microns, and together with the undersized fraction is lead to the fluid bed unit as seed or nuclei particles. 650 kg/hour of the fine product fraction is recycled without prior grinding.

The remaining material from the product fractions is led through an oven in which the remaining moisture and organic additions (approximately 4% by weight) are removed. The material is then sintered in a rotary kiln at a temperature of approximately 1500° C. for approximately 10 minutes. The sintered particles are then subjected to a further sieving operation to assure that substantially all of the product has the appropriate particle size.

It will be apparent to those skilled in the art that various modifications and variations can be made in the present invention without departing from the scope or spirit of the invention. Thus, it is intended that the present invention cover the modifications and variations of this invention provided that they come within the scope of the appended claims and their equivalents.

What is claimed is:

1. A high strength propping agent for use in hydraulic fracturing of subterranean formations comprising solid, spherical particles, said particles having an alumina (A1203) content of between 40 and 60%, a density of less than 3.0 gm/cc and ambient temperature permeability of 100,000 or more millidarcies at 10,000 psi.

2. The propping agent of claim 1 wherein said particles have an alumina ($Al_2O_3$) content of between 45.5 and 60% and a silica ($SiO_2$) content of between 36.5 and 51%.

3. The propping agent of claim 1 wherein the composition of said particles comprises: about 50.7% $Al_2O_3$; about 45.8% $SiO_2$; about 2.60% $TiO_2$; and about 0.70% $Fe_2O_3$; with the remainder being alkali and alkali earth metal oxides 4. The propping agent of claim 1 wherein said particles are made from Eufaula bauxite.

5. The propping agent of claim 4 wherein said Eufaula bauxite includes over 5% gibbsite.

6. The propping agent of claim 4 wherein said Eufaula bauxite has a loss on ignition of between 14.5 and 20%.

7. The propping agent of claim 4 wherein said Eufaula bauxite has a loss on ignition of about 17.1%.

8. The propping agent of claim 1 wherein said particles have a Krumbein sphericity of 0.9 or greater.

9. The propping agent of claim 1 wherein 90% or more of said particles are 30–40 mesh.

10. The propping agent of claim 1 wherein the particles also include a crush strength enhancer selected from the group of nepheline syenite, fused bauxite dust, wollastonite, feldspar and talc.

11. The propping agent of claim 10 wherein the crush strength enhancer is nepheline syenite.

12. The propping agent of claim 1 wherein said particles have been prepared from material comprising naturally occurring ore.

13. The propping agent of claim 12 wherein said naturally occurring ore is Eufaula bauxitic kaolin.

14. The propping agent of claim 12 wherein the density is in the range between 2.62 and 2.80 gm/cc, said particles have been prepared from material comprising naturally occurring ore, and the particles are sintered at a temperature in the range of about 1200° C. to about 1650° C.

15. The propping agent of claim 1 wherein said particles have an alumina content of about 50%.

16. The propping agent of claim 1 wherein said particles have been prepared by sintering.

17. The propping agent of claim 16 wherein said particles have an alumina ($Al_2O_3$) content of between 45.5 and 60% and a silica ($SiO_2$) content of between 36.5 and 51%.

18. The propping agent of claim 16 wherein the composition of said particles comprises: about 50.7% $Al_2O_3$; about 45.8% $SiO_2$; about 2.60% $TiO_2$; and about 0.70% $Fe_2O_3$; with the remainder being alkali and alkali earth metal oxides.

19. The propping agent of claim 16 wherein said particles are made from naturally occurring ore, and the sintering is at temperatures in the range of about 1200° to about 1650° C.

20. The propping agent of claim 19 wherein the naturally occurring ore is Eufaula bauxitic kaolin.

21. The propping agent of claim 20 wherein said Eufaula Bauxite includes over 5% gibbsite.

22. The propping agent of claim 20 wherein said Eufaula Bauxite has a loss on ignition of between 14.5 and 20%.

23. The propping agent of claim 1 wherein said particles have a Krumbein sphericity of 0.9 or greater, 90% or more of said particles are 30–40 mesh, and the particles also include a crush strength enhancer selected from the group of nepheline syenite, fused bauxite dust, wollastonite, feldspar and talc.

24. The propping agent of claim 1 wherein said particles have a density between 2.62 and 2.80 gm/cc, and said particles have been prepared from naturally occurring ore by sintering at temperatures in the range of about 1200° C. to about 1650° C.

25. The propping agent of claim 24 wherein said particles have an alumina ($Al_2O_3$) content of between 45.5 and 60% and a silica ($SiO_2$) content of between 36.5 and 51%.

26. The propping agent of claim 25 wherein the composition of said particles comprises: about 50.7% $Al_2O_3$; about 45.8% $SiO_2$; about 2.60% $TiO_2$; and about 0.70% $Fe_2O_3$; with the remainder being alkali and alkali earth metal oxides.

27. The propping agent of claim 24 wherein said particles are made from Eufaula bauxitic kaolin.

28. The propping agent of claim 27 wherein said bauxitic kaolin includes over 5% gibbsite, said particles have a Krumbein sphericity of 0.9 or greater, 90% or more of said particles are 30-40 mesh, and the particles also include a crush strength enhancer selected from the group of nepheline syenite, fused bauxite dust, wollastonite, feldspar and talc.

* * * * *

UNITED STATES PATENT AND TRADEMARK OFFICE
CERTIFICATE OF CORRECTION

PATENT NO. : 5,120,455
DATED : June 9, 1992
INVENTOR(S) : Eugene P. Lunghofer

It is certified that error appears in the above-identified patent and that said Letters Patent is hereby corrected as shown below:

At column 4, line 66, change "Krum being" to --Krumbein--.

At column 6, lines 60-61, insert --EXAMPLE 5--
                    --Acid Solubility--.

At column 7, line 55, change "agent or the present" to
    --agent of the present--.

At column 8, line 28, change "Factor2" to --Factor--.

At column 8, line 47, change "Factor2" to --Factor--.

At column 11, line 5, change "area of 3 m.2 The" to --area of 3 m.$^2$. The--.

At column 11, line 6, change "is 1 2 m/sec" to --is 1.2 m/sec--.

At column 11, line 49, change "mina (Al203) content" to
    --mina ($Al_2O_3$) content--.

Signed and Sealed this

Twenty-fifth Day of January, 1994

Attest:

BRUCE LEHMAN

Attesting Officer          Commissioner of Patents and Trademarks